3,407,715
PHOTOGRAPHIC FINGERPRINTING
DEVICE AND METHOD
Charles W. McCutchen, 5213 Acacia Ave.,
Bethesda, Md. 20014
Filed Sept. 30, 1965, Ser. No. 491,848
11 Claims. (Cl. 95—1.1)

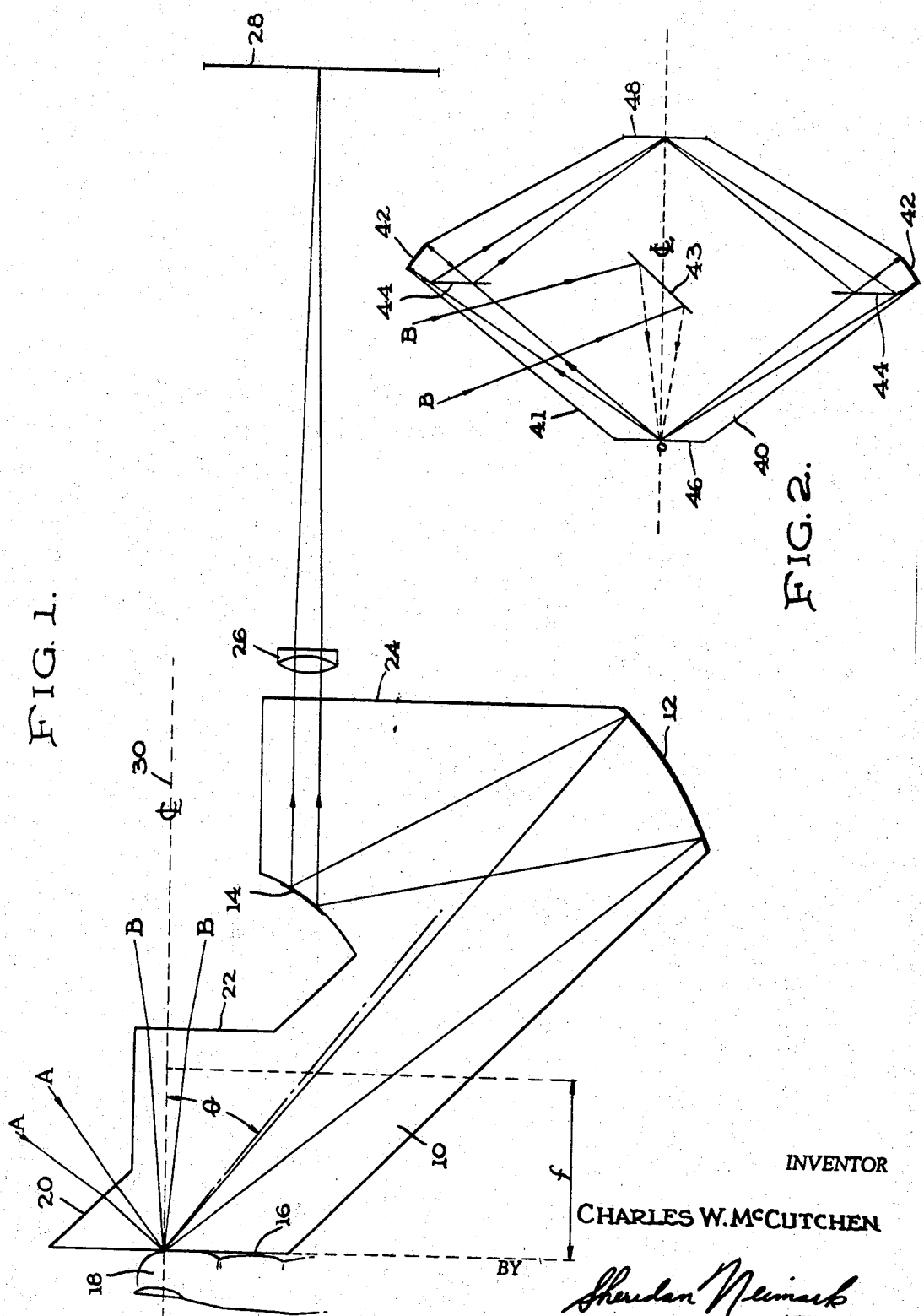
Oct. 29, 1968   C. W. McCUTCHEN   3,407,715
PHOTOGRAPHIC FINGERPRINTING DEVICE AND METHOD
Filed Sept. 30, 1965                    2 Sheets-Sheet 1
INVENTOR
CHARLES W. McCUTCHEN
BY Sheridan Neimark
ATTORNEY United States Patent Office 3,407,715
Patented Oct. 29, 1968

ABSTRACT OF THE DISCLOSURE

A system is provided for obtaining fingerprints photographically using total internal reflection and the associated critical angle phenomena to differentiate contact from non-contact of the object against a transparent plate. A well-focused, undistorted image of the object pressed against the plate is obtained by providing an optical system which has axial symmetry wherein the axis is perpendicular to the object plane.

---

The present invention relates to a system for observing surface topography and, more particularly, a device for obtaining fingerprints photographically.

It is necessary to take fingerprints for a variety of purposes and, in fact, fingerprints or footprints—particularly of infants—are the common means of identification. Therefore the requirement for taking such prints has increased greatly in recent years.

However, the taking of such prints, for whatever purpose, is very messy, dirty and undignified since it requires the subject's fingers or toes to be pressed on an ink pad individually and then transferred to a clean sheet of paper. This is not only messy and time consuming, but requires a degree of skill which necessitates that a professional "fingerprinter" move the subject's fingers rather than permit the subject to take his own prints. In addition, proper rolling of the fingers is necessary and smudging—which requires that the whole messy process be repeated—is not uncommon.

Photographic methods of taking fingerprints have been attempted, but these have invariably resulted in distorted images blurred at the edges because of the inability of the systems to properly focus the prints on the photosensitive surface.

It is, therefore, an object of the present invention to provide a system which obviates the disadvantages of the prior art, such as indicated above.

It is another object of the present invention to provide a device for taking fingerprints simply, neatly, quickly, inexpensively, and accurately.

It is another object of the present invention to provide a method and apparatus for observing surface topography.

It is another object of the present invention to take fingerprints by a novel means and method.

It is another object of the present invention to provide a novel lens arrangement which will form an accurate image of the surface characteristics of objects, such as fingers.

These and other objects are obtained by the present invention which, in general, comprises a device having a transparent plate or planar surface on which to support the object—such as a finger—to be viewed or photographed, light transferring means which embodies a complex optical system such as a solid optical element which may include a series of reflecting surfaces arranged in a predetermined manner, and a viewing screen or photographic plate upon which the light transferring means casts an image of the object. It is an important aspect of the present invention that th light directed to the object plane must be reflected therefrom at a greater angle than the critical angle measured from a perpendicular to the transparent plate surface.

The above and other objects, as well as the nature and advantages of the present invention will be more apparent from the following detailed description taken in conjunction with the drawings wherein:

FIG. 1 is a schematic illustration of a first and preferred embodiment of the present invention including the arrangement of the light transferring means;

FIG. 2 is a schematic illustration similar to FIG. 1 showing another embodiment.

Figure 3:
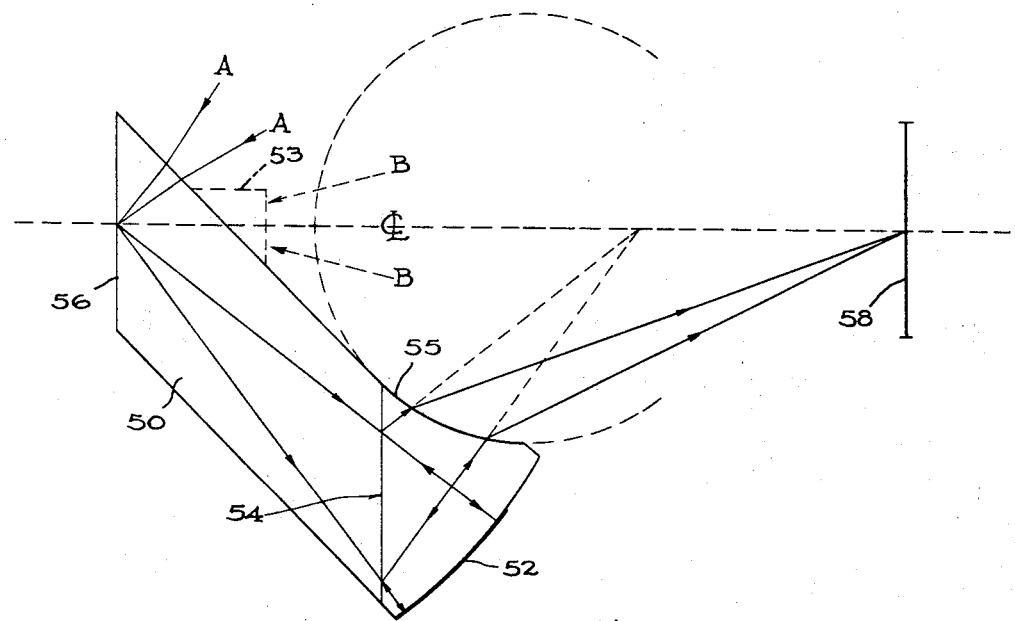
FIGS. 3 and 4 are schematic illustrations similar to FIGS. 1 and 2 showing two other embodiments.

The theoretical aspects of the present invention are described in detail in my article of October 1964, entitled "Optical Systems for Observing Surface Topography by Frustrated Total Internal Reflection and by Interference" appearing in "The Review of Scientific Instruments," Volume 35, Number 10, which is hereby incorporated by reference. Basically the present invention involves the combination of the use of total internal reflection and the associated critical angle phenomena to differentiate contact from non-contact of the object against the transparent plate together with optical systems capable of giving a well-focused, undistorted image of the object surface. The prior art use of total internal reflection does not give well-focused, distortion-free images. The well-focused, distortion-free image is obtained by providing the axis of the at least partially axially symmetrical optical system normal to the object plane.

FIG. 1 shows a preferred form of the present invention. A solid optical element 10 is provided having a focal length $f$ and a critical angle of $\theta$. While the optical element 10 is preferably formed of glass, it may be formed of any dense homogeneous transparent material.

The optical element 10 has a complex shape and is provided with two mirrored surfaces 12 and 14. The mirrored surface 12 is provided with a concave shape and the mirrored surface 14 with a convex shape. The optical element 10 is also provided with a flat wall 16 corresponding to a transparent plate or surface upon which the object to be observed—such as finger 18—is placed.

A suitable light source may be utilized to provide illumination in the direction A or, alternatively, in the direction B. Where light A is used, the light enters the optical element 10 through a surface 20 and passes to the plate 16. Similarly, if light B is used, the light enters the optical element 10 through a surface 22 and passes to the plate 16.

After reflection from the object 18, in a manner described in more detail below, and passage through the optical element 10, the light emerges from the optical element through a surface 24 at a focus of infinity. To be observed as an image the light is then passed through a lens 26 which focuses the light in the form of the desired image on a suitable viewing plate 28. Such viewing plate is preferably a photographic plate or some other type of phottosensitive layer, but it may be a ground glass viewing screen or an eyepiece for direct observation.

The present invention is particularly suitable for taking fingerprints photographically. As indicated above, the subject's finger, hand or foot, etc. is placed against the transparent plate 16. An image of the object lying against the plate is projected upon a photosensitive surface 28 through the optical element. The light used to form the image is selected so that it must have emerged from the plate surface at an angle from the perpendicular to that surface which is greater than the critical angle.

If the illumination is in the direction A, then the light will be totally reflected everywhere except where a papillary ridge touches the plate surface. The papillary ridges will therefore appear dark to the observer. If the illumination is in the direction B, then the light will enter the finger surface, diffuse around within it, and will return through the plate surface. Only where a papillary ridge touches the plate surface 16 can the light enter the optical element and this results in the papillary ridges appearing bright to the observer.

The system of FIG. 1 is very nearly achromatic. While shown to be asymmetric about the centerline 30, it will be understood that the optical element 10 may be symmetrical about the axis 30.

The device of FIG. 2 comprises a solid optical element 40 having a transparent plate 46 and an image receiving plate 48. Light of the B type (although A type illumination can also be used) is shown entering the optical element 40 through the surface 41 and passing through the optical element 40 to an internal mirror 43 which reflects the light toward the transparent plate 46. The light reflected from (type B illumination) or transmitted by (type A illumination) the plate 46 is modulated by the finger or other object as described above in relation to FIG. 1.

The device of FIG. 2 is shown to be symmetrical about a centerline although it may be asymmetric as the device illustrated in FIG. 1. After the light modulated by the finger leaves the plate surface 46, it passes through a half-silvered internal mirror 44, such mirror 44 having an annular form in the axially symmetrical embodiment. The light then passes through the mirror 44 and reaches an annular concave mirror 42 which reflects it to the back of the annular mirror 44, which in turn reflects such light to the photosensitive or viewing plate 48 where it forms the desired image. The system of FIG. 2 is precisely achromatic.

FIG. 3 shows a device comprising a solid optical element 50 having a transparent plate 56. Light of the A type is shown entering the optical element 50 through the surface 51 and then being modulated by the finger at the transparent plate 56 as described above in relation to FIG. 1. Light of the B type may also be used as shown in phantom in which case the optical element 50 must be enlarged by the portion 53.

The device in FIG. 3 is shown in its asymmetric form, although it will be understood that it may be axially symmetrical about a centerline as the device in FIG. 1. As the light from the finger is reflected from the plate surface 56, it passes through a half-silvered internal mirror 54, which—in the axially symmetrical embodiment—would be annular. After the light passes through the half-silvered mirror 54, it reaches a concave mirror 52 which reflects it to the reflective back surface of the planar half-silvered mirror 54. The mirror 54 then reflects the light to a surface 55 of the optical element 50, such surface 55 refracting the image toward a photosensitive or viewing plate 58. The surface 55 takes the form of a negative Amici aplanatic sphere (an Amici sphere is a sphere cut off flat at its inner aplanatic point) as shown in phantom. This system requires monochromatic light.

Figure 4:
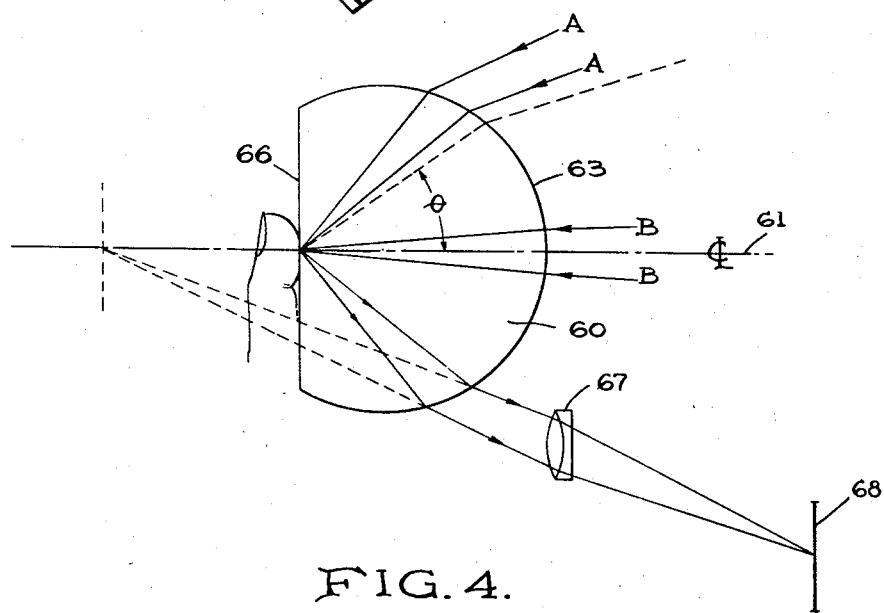

The device shown in FIG. 4 includes a lens 60 symmetrical about a centerline 61 in the form of an Amici sphere and having a transparent plate 66. Illumination of either type A or B may be used as illustrated, both types entering the lens 60 through the spherical surface 63 and then being modulated by the fingers at the transparent plate 66 as described in relation to FIG. 1. The reflected light then passes through the optical element to the surface 73 where it is refracted to a lens 67 which focuses the image on a viewing or photosensitive plate 68. The lens 67 is a photographic type lens and it is oriented on an axis parallel but not concentric to the axis of the Amici sphere. This system also requires monochromatic light.

Those systems which are axially symmetrical including FIG. 4 require less light than the asymmetric systems. However, the embodiments of FIGS. 1-3 which are asymmetric are more compact and less critical optically.

It will be obvious to those skilled in the art that various changes may be made without departing from the scope of the invention and therefore the invetnion is not limited to what is shown in the drawings and described in the specification but only as indicated in the appended claims.

What is claimed is:

1. A method of taking fingerprints photographically comprising passing light through an optical system—which is at least partially axially symmetrical about a centerline—to a transparent surface upon which the finger to be printed rests, said transparent surface upon which the finger rests being perpendicular to said centerline; modulating said light at the finger surface by the use of frustrated total internal reflection and passing said light at an angle from the perpendicular to the surface upon which said finger rests greater than the critical angle; passing said light through said optical system; and focusing said light in the form of an image on a photosensitive surface.

2. A device for observing fingerprints comprising: transparent plate means upon which a finger is placed; means to direct light towards said transparent plate; light transferring means to receive light modulated at said finger on said transparent plate by the use of frustrated total internal reflection and to transfer said light at a greater angle than the critical angle measured from a perpendicular to said plate, said means including at least one solid optical element of complex shape which is at least partially axially symmetrical about a centerline perpendicular to said transparent plate upon which the finger is placed; and means to receive said light in the form of an image for viewing.

3. A device in accordance with claim 2 wherein said image receiving means comprises a photosensitive plate.

4. A device in accordance with claim 2 wherein said image receiving means comprises a viewing screen.

5. A device in accordance with claim 2 wherein said image receiving means comprises an eye lens.

6. A device in accordance with claim 2 wherein said light transferring means also comprises a lens, said lens and said solid optical element having parallel axes of symmetry.

7. A device in accordance with claim 2 wherein said solid optical element is completely axially symmetrical about a centerline.

8. A device in accordance with claim 2 wherein said complex solid optical element comprises a concave mirror which receives the light from the finger, and a convex mirror which receives the light from said concave mirror and delivers it from said solid optical element at focus infinity, and said light transferring means further comprises a lens to focus said light to form an image.

9. A device in accordance with claim 2 wherein said complex solid optical element comprises a planar mirror which receives the light from said light source for reflection to said transparent plate, a half-silvered mirror for permitting passage therethrough of the light from said finger, and a concave mirror for reflecting said light which has passed through said half-silvered mirror back to the back surface of said half-silvered mirror where said light is reflected to said image receiving means.

10. A device in accordance with claim 2 wherein said complex solid optical element comprises a half-silvered mirror which receives the light from the finger and permits passage therethrough, a concave mirror for reflecting said light which has passed through said half-silvered mirror back to the back surface of said half-silvered mirror where said light is again reflected, and a negative aplanatic sphere surface of said solid optical element which receives said light from the back of said half-silvered mirror and refracts said light to said image receiving means.

11. A device in accordance with claim 2 wherein said complex solid optical element comprises an Amici sphere, and said light transferring means further comprises a lens having its axis parallel but not concentric to the aixs of said sphere, said lens serving to form an image from the light from said sphere.

References Cited

UNITED STATES PATENTS

| 3,174,414 | 3/1965 | Myer | 88—24 X |
| 3,282,152 | 11/1966 | Myer | 88—24 |

NORTON ANSHER, *Primary Examiner.*

RICHARD A. WINTERCORN, *Assistant Examiner.*